United States Patent [19]

van der Lely

[11] 4,042,042
[45] Aug. 16, 1977

[54] SOIL CULTIVATING MACHINES
[76] Inventor: Cornelis van der Lely, 73 Bruschenrain, Zug, Switzerland
[21] Appl. No.: 613,885
[22] Filed: Sept. 16, 1975
[30] Foreign Application Priority Data
Sept. 16, 1974 Netherlands .................. 7412227
[51] Int. Cl.² ........................................... A61B 19/06
[52] U.S. Cl. ........................................ 172/91; 172/48; 172/68; 172/100; 172/102; 172/110; 172/526
[58] Field of Search ..................... 172/35, 48-53, 172/55-57, 59, 60, 68, 91, 92, 97-102, 110, 111, 522-526

[56] References Cited
U.S. PATENT DOCUMENTS
937,607  10/1909  Hoover ........................ 172/526
FOREIGN PATENT DOCUMENTS
69,803  11/1892  Germany ...................... 172/526
1,557,789  1/1970  Germany ...................... 172/100
1,060,657  3/1967  United Kingdom ............. 172/102
646,318  11/1950  United Kingdom ............... 172/97
847,413  9/1960  United Kingdom ............. 172/523

Primary Examiner—Paul E. Shapiro
Attorney, Agent, or Firm—Mason, Mason & Albright

[57] ABSTRACT

A soil cultivating machine has a frame beam with a forward supporting member and a rear supporting member. The frame beam and the supporting members are all elongated and extend transverse to the direction of travel. The opposite lateral ends of one supporting member are linked to the corresponding ends of the other member by curved coupling members and both supporting members are movable about substantially vertical axes in directions transverse to the normal direction of travel of the machine. Tined cultivating members are mounted on each of the supporting and coupling members for free rotation about upwardly extending axes.

10 Claims, 6 Drawing Figures

SOIL CULTIVATING MACHINES

The construction of the present machine is such as to permit in a simple manner of ensuring an effective cooperation between supporting members arranged one behind the other with respect to the operative travelling direction of the machine.

Figure 1:
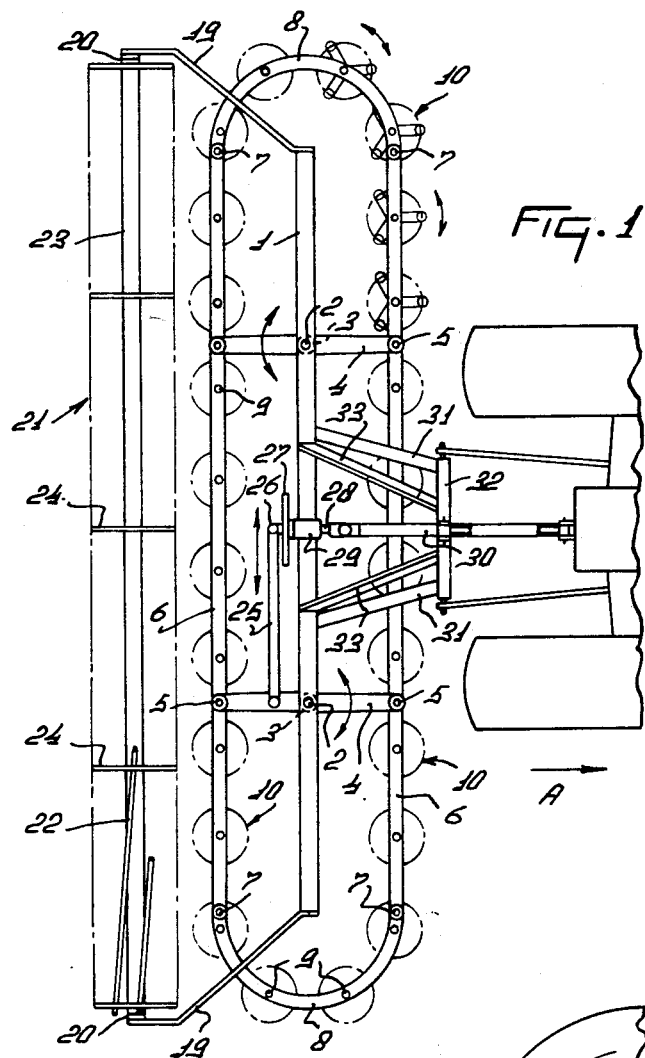
Figure 2:
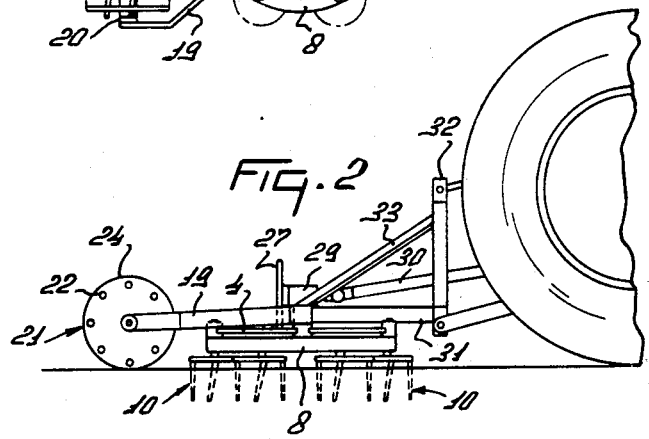
Figure 3:
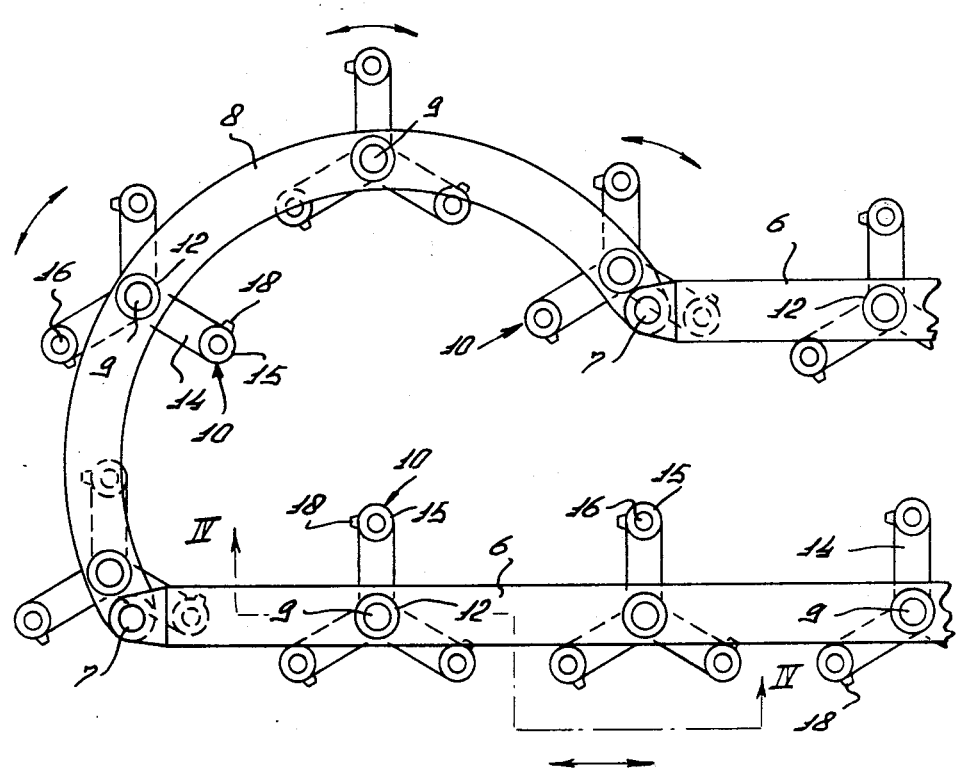
Figure 4:
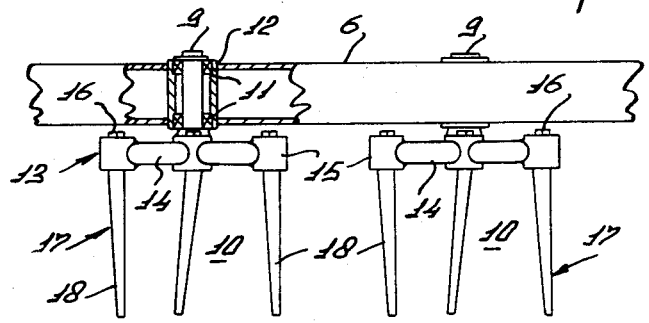
Figure 5:
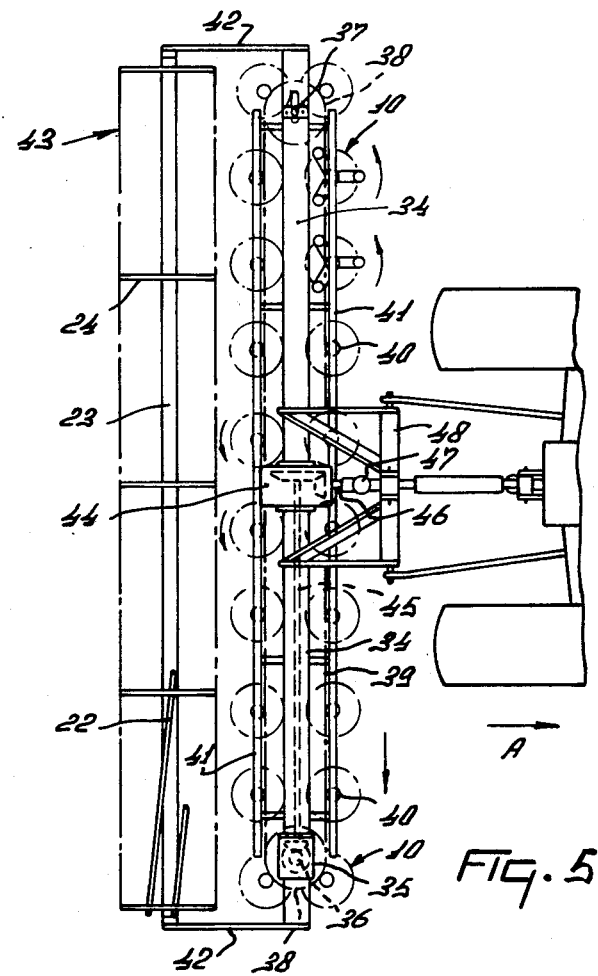
Figure 6:
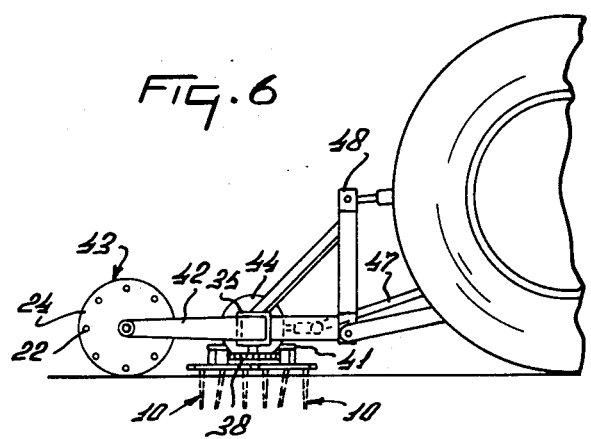

For a better understanding of the invention and to show how the same may be carried into effect, reference will now be made by way of example to the accompanying drawings in which:

FIG. 1 is a schematic plan view of a soil culitvating machine, shown hitched to a tractor, FIG. 2 is a side view of the machine as shown in FIG. 1, FIG. 3 is a plan view on a larger scale of a detail of the machine of FIGS. 1 and 2, FIG. 4 is a side view taken on the line IV—IV in FIG. 3, FIG. 5 is a schematic plan view of a second form of soil cultivating machine, shown hitched to a tractor, and FIG. 6 is a side view of the machine as shown in FIG. 5.

Referring first to FIGS. 1 to 4, the soil cultivating machine, which is a power harrow, has a frame beam 1 extending transversely of the intended direction of operative travel of the machine and provided at equal distances from its ends with upright stub shafts 2. By means of sleeves 3, arms 4 extending substantially in the direction of travel A are arranged around the stub shafts 2, each arm 4 being pivotally connected near its front and rear ends by means of stub shafts 5 with supporting members 6 formed by beams, extending transversely of the direction of traavel A and thus substantially parallel to the frame beam 1. The supporting members 6 are pivotally interconnected at their ends by means of stub shafts 7 with outwardly curved coupling members 8.

At equal intervals the supporting members 6 and the coupling members 8 are provided with soil cultivating members 10 adapted to rotate freely about upright shafts 9. Each of the shafts 9 is held by bearings 11 near the top and bottom ends of a sleeve 12 (FIG. 4). Each of the cultivating members 10 has a support 13 fastened to the lower end of the relevant shaft 9 and having three arms 14. The arms 14 extend radially away from the shaft 9 and are straight including angles of about 120° with one another. At the free end of each arm 14 a holder 15 accommodates a fastening portion 16 of a downwardly extending tine 17 which is inclined to the horizontal by an angle of at least 45°. The fastening portion 16 is fixed in the holder 15 by means of a nut screwed onto the screwthreaded top end of the tine fastening portion. The longitudinal center line of the straight, downwardly tapering operative portion 18 of the tine is at an angle of preferably about 8° to the longitudinal center line of the fastening portion 16 of the tine. The distance between two adjacent tines 17 of each cultivating member 10 is preferably about 25 cms. and the distance between two adjacent cultivating members on the supporting members 6 and on the coupling members 8 is smaller, preferably about 15 cms, or it is substantially equal to the effective width of a cultivating member. From FIG. 1 it will be apparent that the distance between one cultivating member on each supporting member 6 and an adjacent cultivating member on one or other of the coupling members 8 is equal to the distances between the cultivating members on the supporting members 6 or the coupling members 8. The pivotal points of the arms 4, extending in the direction of travel A, on the beams 6 are located, as will be seen from FIG. 1, midway between the shafts 9 of two adjacent cultivating members 10.

At the ends of the frame beam 1, arms 19 extend sideways and are inclined downwardly and rearwardly. Near their free ends these arms 19 are bent over by a portion extending, viewed on plan, substantially in the direction of travel A.

Between these bent-over portions a working member 21 is supported by means of bearings 20 in which it is freely rotatable. The working member 21 comprises a plurality of elongated elements 22 extending along the circumference of the member substantially in the direction of its horizontal rotary axis, which is substantially parallel to the frame beam 1 and thus transverse of the direction of travel A. The elongated elements 22 are held at the circumference of equally spaced supports arranged on a tubular, central support 23. The elongated elements 22 are preferably formed by circular-section rods.

The right-hand arm 4, viewed from the rear and in the direction of travel A, is pivotally connected at a distance behind the stub shaft 2 on the frame beam 1 with one end of an arm 25, the other end of which is pivotally connected with a stub shaft 26 on a crank disc 27 which is carried by a shaft 28 extending in the direction of travel A and supported in a bearing 29 at the top of the frame beam 1. The front end of the shaft 28, which is located substantially at the center of the frame beam 1, can be connected (as illustrated) by means of an auxiliary shaft 30 with the power take-off shaft of a tractor. At a distance from the center the frame beam 1 is provided with forwardly converging beams 31 which are coupled at their front ends with a trestle 32 which serves for the attachment of the machine to the three-point lift of the tractor. On the rear, near the top of the trestle 32, the frame beam 1 is provided with supporting beams 33.

The machine described above operates as follows:

In operation the machine is attached by means of the trestle 32 to the three-point lift of the tractor and the shaft 28 is linked via the auxiliary shaft 30 to the power take-off shaft of the tractor. During forward travel in the direction of the arrow A, the right-hand arm 4 is caused to reciprocate by the crank mechanism comprising the crank disc 27 and the arm 25, so that the two supporting members 6 are reciprocated, moving in mutually opposite senses. The cultivating members 10 freely rotatable on the supporting members 6 and the coupling members 8 move with the members 6 and 8 and thus, because the tines 17 are in contact with the ground, the members 10 angularly reciprocate on their shafts 9. The operative portions 18 of the tines 17 thus produce an effective, homogeneous crumbling of the soil substantially without lateral displacement of earth.

The coupling members 8 are each in the form of a semicircle having a radius which corresponds substantially with that of the axes described in operation by the ends of the supporting members 6.

The distance over which each cultivating member 10 is moved substantially transversely of the direction of travel A by movement of its supporting member 6 amounts to about 75 cms. During the reciprocatory movement of the rotatable cultivating members 10 the crumbled earth is uniformly distributed so that after the cultivating members have passed along a flat seed bed is left behind. Since two supporting members 6 each provided with freely rotatable cultivating members 10 are aranged one behind the other, a very intensive cultivation can be obtained, which is particularly important on hard, heavy soil. When stones or suchlike obstacles in the ground are struck by the tines, the stones can move past between the cultivating members, since the cultivating members are capable of turning about their shafts 9 in either direction.

In operation as the soil to be worked is penetrated by the operative portion 18 of the tine 17 of each cultivating member 10 that is, at the time, the leading tine of the cultivating member with respect to the soil to be worked, this leading tine causes the cultivating member 10 to turn about its shaft 9, owing to the movement of the supporting members 6 and the coupling members 8, so that the operative portion of the next tine is pressed into the soil to be worked. The inclined position of the operative tine portion ensures that even in loose soil the cultivating members 10 will effectively turn about their rotary shafts 9.

In the embodiment shown each cultivating member has three tines 17 grouped around the central shaft 9. Thus an effective turning of the cultivating member is ensured during the reciprocatory movement of the supports.

Since the interaction between the tines and the soil causes the cultivating members to rotate, the soil is not substantially displaced sideways. Thus the condition of the ground surface is improved substantially without lateral displacement of earth, while accummulation of earth in front of the tines is minimised since the earth can readily pass between the tines. The rotating tines draw the earth past between them.

By means of the curved coupling members 8 the sides of the worked strip of land are satisfactorily cultivated into a regular form. Moreover, the ends of the supporting members 6 are effectively supported.

The rotatable working member 21 provided with the elongated elements 22 and located behind the cultivating members 10 provides an aftertreatment of the soil already worked by the tines of the cultivating members throughout the strip of land being cultivated, which results in a further improvement of the condition of the seed bed, particularly on stony soil. Although this is not shown in the Figures, the arms 19 holding the working member 21 may be pivotally arranged on the frame beam 1 so that it can be set into and fixed in any of a plurality of positions by means of an adjusting member, whereby the working depth of the tines of the cultivating members can be adjusted by means of the working member.

In the machine shown schematically in FIG. 5 and 6 the freely rotatable cultivating members corresponding with those of the machine just described are designated by the same reference numerals. This machine has a hollow frame beam 34 extending transversely of the direction of operative travel A and carrying near one end a gear box 35 in which an upright shaft 36 is journalled so as to project from the bottom of the hollow beam. Near the other end the frame beam 34 has an upright shaft 37 which also projects from the bottom of the hollow beam and which, as is shown schematically, is slidable in the direction of length of the hollow frame beam and fixable in any of a plurality of positions. Each of the shafts 36 and 37 is provided at the end projecting from the hollow beams 34 with a chain sprocket 38, over which a chain 39 is passed which constitutes an endless supporting member for the cultivating members 10 which are arranged in the same manner as already described. The chain 39 is provided with spaced sleeves 40 in which the rotary shafts 9 of the cultivating members 10 are freely rotatable by means of ball bearings at the top and bottom ends of the sleeves. The sleeves 40 are supported by guides arranged on the beam 34.

At its ends the hollow beam 34 is provided with rearwardly extending downwardly inclined arms 42, between the free ends of which a working member 43 extends transversely of the direction of movement so as to be freely rotatable. The working member 43 is constructed in the same manner as the working member 21 already described and the same reference numerals indicate the same components. The working member 43 covers the whole effective width of the freely rotatable cultivating members 10 arranged on the endless supporting member 39 formed by the chain 39.

Near its mid-point the hollow beam 34 is provided with a gear box 44 in which is held a shaft 45 extending in the direction of length of the frame beam and having one end located in the gear box 44. Inside the gear box 35 the shaft 45 is drivably connected by means of a bevel gear wheel transmission with the upright shaft 36 holding the chain sprocket 38. Inside the gear box 44 the shaft 45 is connected through a bevel gear wheel transmission with a shaft 46 projecting from the front of the gear box and extending in the direction of travel A and adapted to be coupled, as illustrated, via an auxiliary shaft 47 with the power take-off shaft of a tractor.

At the front, in the region of its mid-point, the hollow frame beam 34 is provided with a trestle 48 for the attachment of the machine to the three-point lift of the tractor.

In operation the machine attached by means of the trestle 48 to the three-point lift of the tractor is moved in the direction of the arrow A and the endless supporting member formed by the chain 39 for the freely rotatable cultivating members 10 is driven through the transmission described above to run in the direction indicated by an arrow in FIG. 5. The foremost run of the supporting member, extending transversely of the direction of travel, thus moves from left to right, viewed from the rear in the direction of travel, whereas the rearmost run of the supporting member moves from right to left. During the movement, in the manner already described, those tines of the cultivating members that penetrate into the soil to be worked cause the cultivating members to rotate in the direction indicated by the curved arrows in FIG. 5 so that the soil is cultivated in a manner corresponding with that just described. As before any stones struck in the ground can be readily disengaged, while the freely rotatable cultivating members produce a homogeneous crumbling and a uniform distribution of the worked earth, while substantially no lateral displacement of earth is involved. The operation of the working member 43 corresponds with the operation of the working member 21 already described. Also as already described the shafts of the freely rotatable cultivating members 10 are located on a straight line which extends transversely of the direction of travel A.

The constructions described above provide soil cultivating machines which provide not only a very effective crumbling of the soil but which require only a minimum amount of power for this crumbling operation, while the undesirable, lateral displacement of earth inherent in the power harrows hitherto known is substantially nil.

While various features of the soil cultivating machines that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. A soil cultivating machine comprising a frame with two elongated transverse beams, including a forward beam and a rear beam, said beams extending substantially horizontal and being spaced apart from one another with respect to the direction of normal travel of the machine, driving means connected to move said beams back and forth about substantially vertical axes and in directions transverse to said direction of travel, each beam supporting a plurality of cultivating members mounted along the length thereof and each beam having outer ends, at least one outer end of the forward beam being pivotally connected to a corresponding and adjacent outer end of the rear beam by a coupling member, further cultivating members being mounted along the length of said coupling member, said coupling member interconnecting said beams and defining a working side of the machine, said coupling member being moved back and forth by the movements of said beams during operation.

2. A soil cultivating machine as claimed in claim 1, wherein each end of the forward beam is pivotally connected to the corresponding and adjacent end of said rear beam with a coupling member.

3. A soil cultivating machine as claimed in claim 1, wherein the cultivating members and further cultivating members are freely rotatable about respective upwardly extending axes.

4. A soil cultivating machine as claimed in claim 1, wherein the distances between the rotary axes of adjacent cultivating members are substantially equal.

5. A soil cultivating machine as claimed in claim 4 wherein the distance between two adjacent cultivating members is about 15 cms.

6. A soil cultivating machine comprising a frame with two elongated transverse beams, including a forward beam and a rear beam, said beams extending substantially horizontal and being spaced apart from one another with respect to the direction of normal travel of the machine, driving means connected to move said beams back and forth about substantially vertical axes and in directions transverse to said direction of travel, each beam supporting a plurality of cultivating members mounted along the length thereof and each beam having outer ends, the adjacent outer ends of the forward and rear beams being linked to one another by respective coupling members and further cultivating members being mounted along the lengths of said coupling members, said coupling members being supported by said beams and defining working sides of the machine, said coupling members being moved back and forth by the movements of said beams during operation.

7. A soil cultivating machine as claimed in claim 6, wherein the coupling members have a curved shape when viewed in plan.

8. A soil cultivating machine as claimed in claim 7, wherein each coupling member has the shape of an arc of a circle the radius of which corresponds substantially with that of an arc of a circle described by the movements of one end of one supporting member.

9. A soil cultivating machine as claimed in claim 6, wherein said cultivating members and further coupling members are freely rotatable about upwardly extending axes.

10. A soil cultivating machine as claimed in claim 9, wherein the rotary axes of said cultivating members and further coupling members extend substantially parallel to said axes about which said beams are movable.

* * * * *